United States Patent [19]

Folmer et al.

[11] 4,313,581
[45] Feb. 2, 1982

[54] REVERSER DOOR MECHANISMS

[75] Inventors: Carroll W. Folmer; Aldridge T. Hunter, both of San Diego, Calif.

[73] Assignee: Rohr Industries, Inc., Chula Vista, Calif.

[21] Appl. No.: 74,823

[22] Filed: Sep. 12, 1979

[51] Int. Cl.³ .................. B64C 15/04; F02K 3/06
[52] U.S. Cl. ..................... 244/110 B; 60/226 A; 239/265.33
[58] Field of Search ............. 244/110 B, 23 D, 12.5; 239/265.29, 265.31, 265.33; 60/226 A

[56] References Cited

U.S. PATENT DOCUMENTS

| | | | |
|---|---|---|---|
| 2,950,595 | 8/1960 | Laucher et al. | 239/265.31 |
| 3,059,426 | 10/1962 | Laucher et al. | 239/265.31 |
| 3,153,321 | 10/1964 | Spears | 239/265.31 |
| 3,347,467 | 10/1967 | Carl et al. | 239/265.31 |
| 3,503,211 | 3/1970 | Medawar et al. | 239/265.31 |

Primary Examiner—Galen L. Barefoot
Attorney, Agent, or Firm—Patrick J. Schlesinger; Frank D. Gilliam

[57] ABSTRACT

An improved deployment mechanism for deploying blocker doors between a stowed and a deployed position. At least a pair of operable blocker doors are utilized. These doors are pivotally attached to fixed cowl structure surrounding a turbo fan engine. A yoke member having adjacent curvilinear tracks is carried by a rear translatable cowl section. Sliders are provided that follow the adjacent tracks. A drag link is connected between a slider and fixed aircraft structure and a door deploying link is connected between each blocker door and is associated slider. In a second configuration, more than one blocker door is actuated by a link connected to a single slider, coupled by more than one door deploying link. When the translatable cowl section is translated rearward by conventional actuation, a peripheral outflow passage is formed between the cowl sections and the blocker doors now being deployed redirect the fan air through the peripheral opening.

6 Claims, 9 Drawing Figures

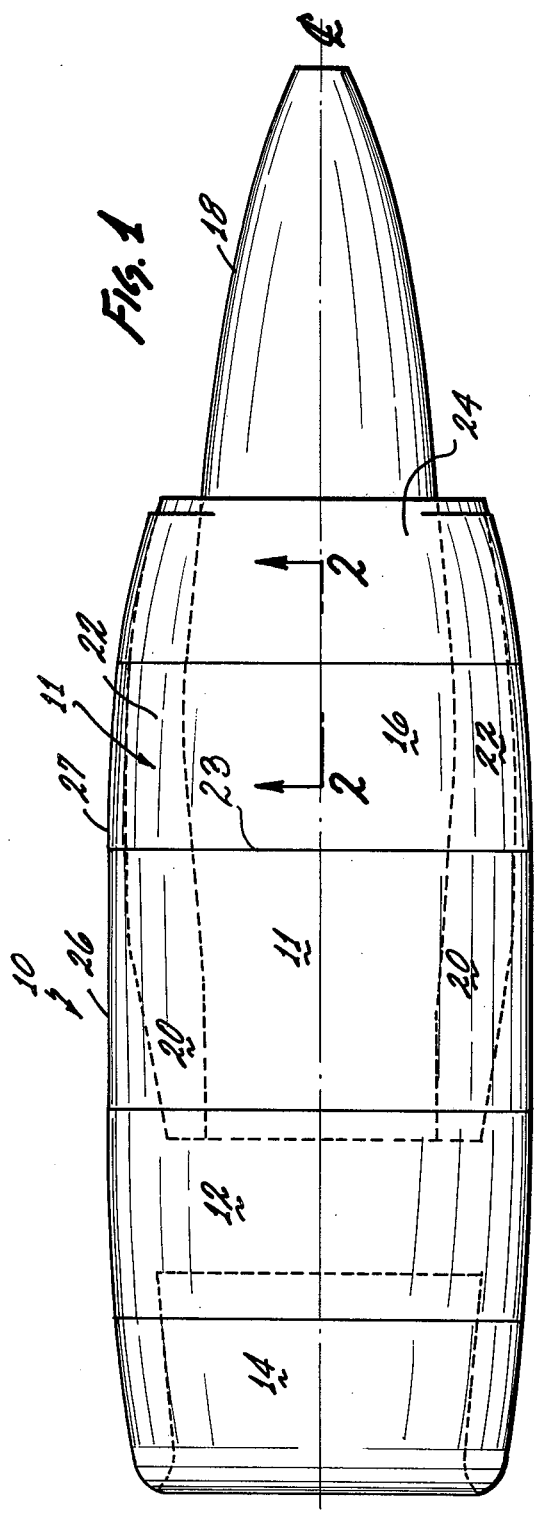
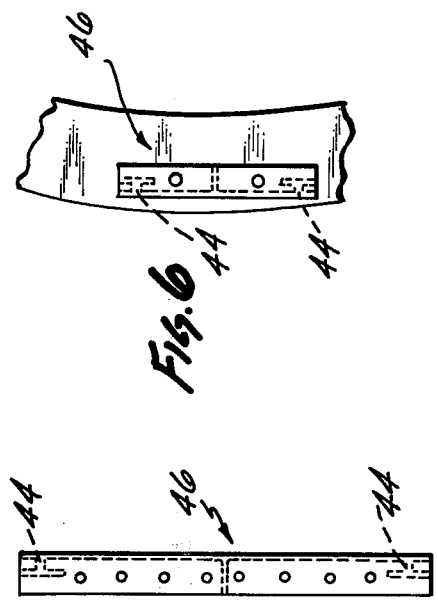
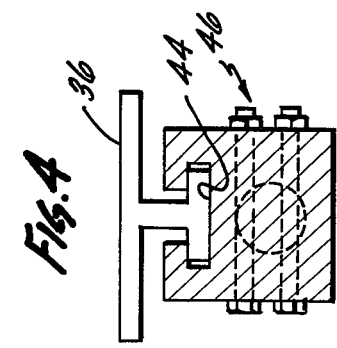

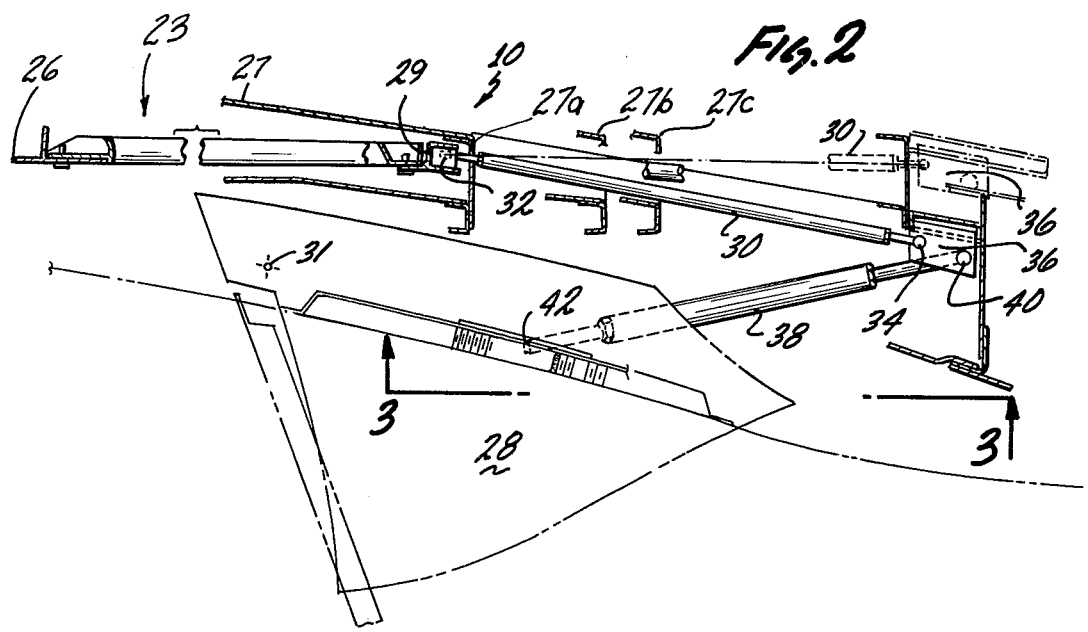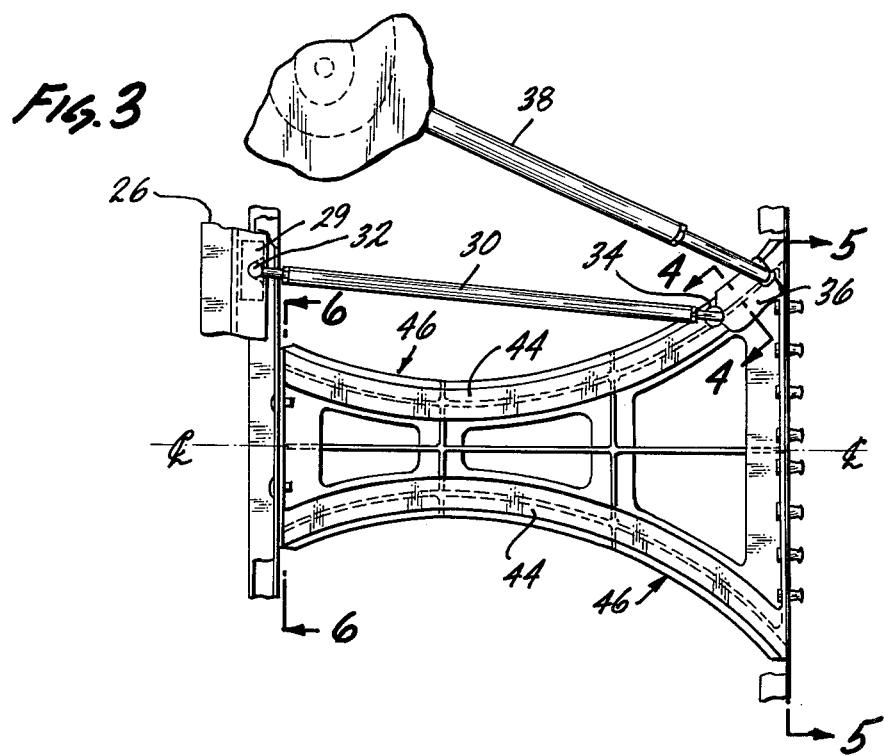

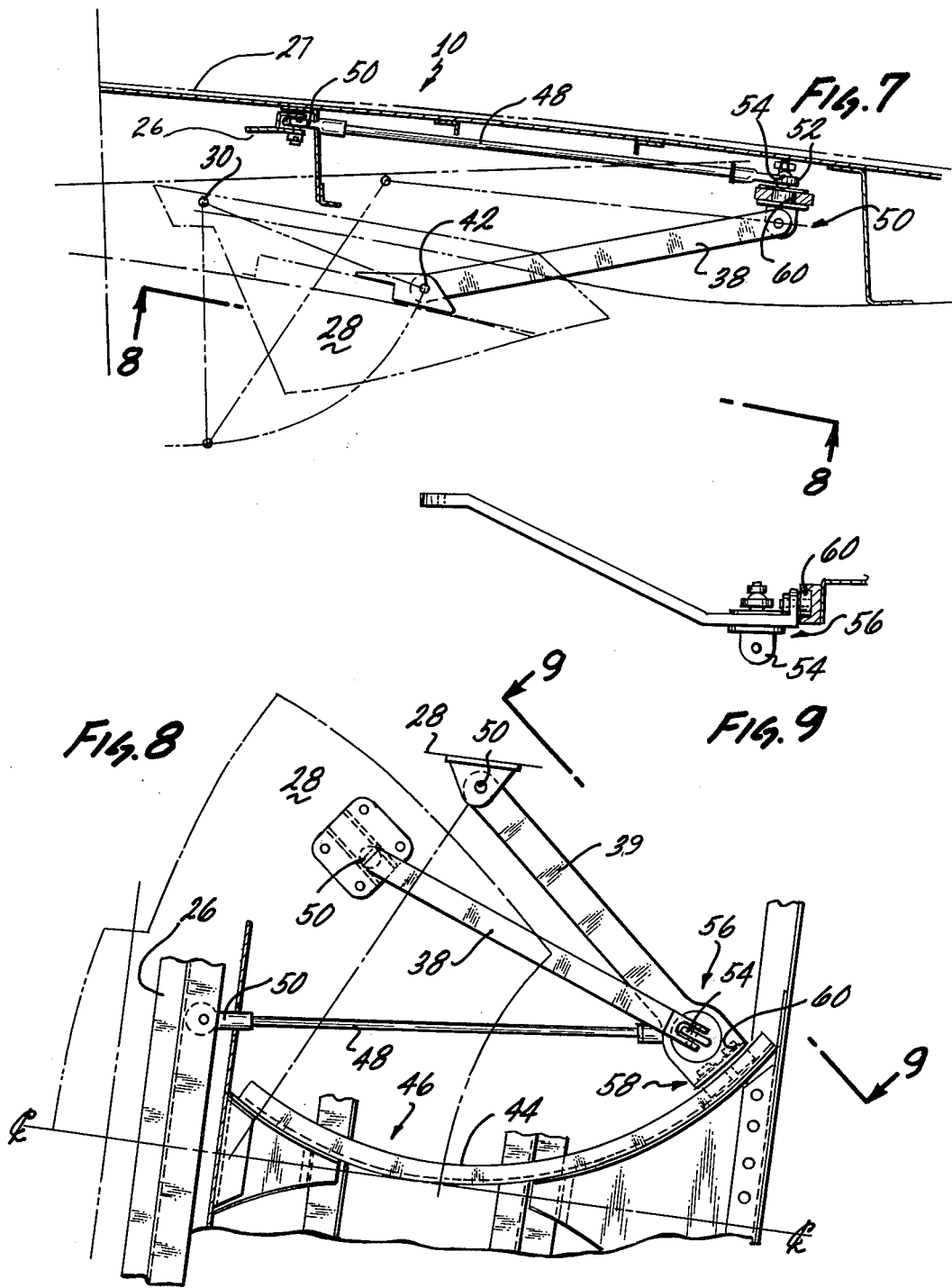

REVERSER DOOR MECHANISMS

BACKGROUND OF THE INVENTION

This invention relates generally to thrust reversers for bypass fan type jet engines and, more specifically, to a linkage system for simultaneously actuating each of the blocker doors utilized therein.

Various thrust reversers and linkage systems have heretofore been provided in which a translatable fan cowl portion is translated rearward to expose an opening or an opening with a ring reversing cascade positioned therein which the bypass fan air flows through when the rearward nozzle exit is blocked by the blocker doors. The blocker doors are either carried by or actuated by the translating fan cowl. Generally, such prior art reversers have been suitable for the purpose intended; however, they have various structural and functional limitations imposed by a specific structure and combination of parts employed to accomplish the reverser function without compromising any of the aerodynamic characteristics, performance and function desired of the engine. The restrictions have been limitations in fan duct geometry, cost, excess weight for small aircraft, complexity of operation with result in high maintenance expense and varying loading on the engine during operation.

SUMMARY OF THE INVENTION

The present invention obtains the various benefits of the prior art devices with reduction of economic costs, weight and complexity, while maintaining a substantially constant pressure loading on the engine through the various positions of the translating cowl section and reverser blocker doors positioning relating thereto. Generally stated, the apparatus of the instant invention includes an elongated nacelle section which surrounds the engine and forms therewith a combination fan and primary exhaust duct therebetween for directing the rearward flow of the engine gases. This engine nacelle is typically divided into a forward fixedly positioned section and a rearward translatable section near the nacelle aft end. When the rearward section is in a stowed position, it defines a streamlined continuation of the forward portions, and when deployed to its extreme rearward position, defines a peripheral outflow passage between the sections for communicating with the engine gases.

A plurality of blocker doors are pivotally attached to the forward fixed nacelle section. A yoke member is fixedly attached to the rearward nacelle section and translates therewith. A yoke member is provided to operate at least two blocker doors, although more may be deployed if desired. Each yoke member has a curvilinear track along adjacent outer surfaces. Each track carries a slider member which is translatable along and captured by its associated track member. A drag link member is pivotally connected to the slider along with at least one blocker door actuating link member. The drag link is pivotally connected at its opposite end to the fixedly positioned forward nacelle section. The actuating link member is attached to the blocker door at its opposite end. In a second embodiment, a plurality of actuating link members are connected to a single slide member for actuating a plurality of associated blocker doors. When the rear nacelle section is translated rearwardly, the blocker door blocks the rear flow of fan air and redirects this flow through the periperhal outflow passage.

The mechanism is simple to construct and service, light in weight due to a minimum number of elements utilized for its construction and operation, provides a positive and effective redirecting of the fan air, and when the actuating mechanism is in a stowed position, substantially all of the mechanism is positioned out of the normal rearward flow of engine gases.

The principal object of this invention is to provide an actuating mechanism that is simple and positive acting and does not affect the overall performance of the operating engine during reverser deployment.

BRIEF DESCRIPTION OF THE DRAWINGS

FIG. 1 is an elevated showing of the engine nacelle with various associated components in phantom.

FIG. 2 is a first embodiment of the section of the nacelle of FIG. 1 taken along line 2—2.

FIG. 3 is a portion of the FIG. 2 showing taken along line 3—3.

FIG. 4 is a portion of FIG. 3 taken along line 4—4 showing the slider track.

FIG. 5 is an end view of the aft portion of the yoke assembly taken along line 5—5 of FIG. 3.

FIG. 6 is an end view of the forward portion of the yoke assembly taken along line 6—6 of FIG. 3.

FIG. 7 is second embodiment of a section of the nacelle of FIG. 1 taken along line 2—2.

FIG. 8 is a portion of the FIG. 7 showing taken along line 8—8.

FIG. 9 is a portion of FIG. 8 taken along line 9—9.

The same reference numerals are used throughout the drawings and specifications to denote the identical element or part.

DETAILED DESCRIPTION OF THE FIRST PREFERRED EMBODIMENT

Referring now to FIG. 1, there is shown an engine nacelle 10 surrounding an engine 11 having a fan 12, a nose portion 14, a turbine portion 16 with a tail cone 18 (the engine related components shown schematically in phantom). The tail cone 18 and the nacelle 10 define a forward fan duct 20, an aft fan duct 22 and the exhaust nozzle 24. The forward portion 26 of the cowl 10 is fixed in position with respect to the engine 11, while the rear portion 27 of the cowl 10 is translatable with respect to the forward portion 26. The cowl portions 26, 27 abutt at 23 when translatable cowl section 27 is in its normal flight stowed position.

FIG. 2 is a portion of FIG. 1 taken along line 2—2. A blocker door 28 is shown in a stowed position. The blocker door 28 has a forward pivotal connection 31 which is attached to the forward portion 26 of cowl 10 and pivots about its connection when rotated between its stowed and deployed positions. Also attached to the forward portion 26 is an "h" shaped bracket 29. A drag link 30 is pivotally secured at one end 32 within the lower inverted "u" shaped portion of the "h" shaped bracket 29. This drag link 30 has its opposite end 34 pivotally attached to a slider member 36, as can be seen in FIG. 3.

A blocker door deploying link 38 is shown. The blocker door deploying link 38 is pivotally attached at end 40 to a slider member 36, which is attached to a single drag link 30, as described above. The opposite end 42 of the blocker door deploying link 38 is pivotally attached to a blocker door 28. This blocker door attachment is positioned substantially in the center of the upper/rear surface of the blocker door. It should be understood that although only one blocker door deploying link 38 is shown, a second would be associated with the partially shown drag link 30 and a second blocker door 28 not shown.

As can be readily seen in FIG. 3, each slider member 36 operates along a track 44, located along substantially the outer surface of a yoke member 46. These tracks 44 have substantially a "T" shaped cross-section, as can be seen in FIGS. 4-6. The slider members 36 are captured by and have a sliding engagement within the upper portion of the "T" shaped track 44 and extend beyond the "T" slot through the necked-down base portion.

The yoke member 46 is attached to the rear translatable portion 27 of cowl 10 and translates therewith. As can be seen in FIG. 3, these tracks 44 extend considerably further from the longitudinal centerline of the yoke member in a rearward direction then in their forward direction. Each views of the yoke members including the track members are shown in FIGS. 5 and 6. The yoke member 46 is secured to the translatable cowl 27 by any convenient means sufficiently strong to withstand the force which they may be required to encounter under various loading conditions required of the yoke assembly.

DETAILED DESCRIPTION OF THE SECOND PREFERRED EMBODIMENT

The second preferred embodiment, although different in specific details of construction, operates in substantially the same manner as the aforedescribed first preferred embodiment.

FIG. 7 is a view of the apparatus taken along the same line 2—2 of FIG. 1 as is FIG. 2. A drag link 48 is pivotally connected to the forward cowl portion 26 at its forward end 50 and pivotally connected at its opposite end 52 to the eyebolt 56 extending through slider assembly 58. The blocker door deployment link 38 is connected to the eye 54 of slider assembly 58 which rides along track 44 formed along the outer periphery of the yoke member 46. A combination of the eyebolt 56 and the roller bearing assembly 60 form the equivalent of a slider member 36 (hereinbefore discussed under the first preferred embodiment). As shown in FIG. 8, a second blocker door deployment link 39 is also pivotally attached to the eyebolt 56. Thus, at least two blocker doors 28 may be deployed by the single equivalent slider assembly 58. As discussed above, this yoke member 46 also has two tracks 44 and each track extends further from the yoke longitudinal centerline in a rearwardly direction then in its forward direction.

The blocker door deployment link 39, see FIG. 9, has an offset dog leg configuration to account for the spacing of the centers of the two adjacent blocker doors 28 from the plane of the common yoke track 44.

OPERATION OF THE PREFERRED EMBODIMENTS

Assume the translatable cowl portion 27 is in a stowed 27a FIG. 2 or FIG. 7 position. As this translatable portion is translated rearwardly through 27b-27c intermediate translated positioned to a fully deployed position with respect to the fixed cowl section 26, the slider member of slider assemblies 36, 58 move along their associated tracks 44 towards the fixed forward cowl section 26. This cowl translation can be performed by any convenient, conventional actuation system, therebeing numerous different systems well known in this art. The end of the drag link 48 connected to the fixed forward cowl portion 26 causes the slide assembly 58 to maintain a fixed distance from the opposite end of the drag link which effectively causes the slider assemblies to move along their associated tracks 44. As these slider assemblies move along their tracks, the blocker door actuating links cause the blocker doors to rotate about their pivot points into the bypass gas stream. The blocker door rotation is caused by the distance between the center of the blocker door 28 (in its normal stowed position) becoming shorter as the slider assembly moves forward on the track. This link being of stiff contruction forces the blocker doors to rotate the degree required to maintain the same distance between the slider members and the centers of the blocker door deployment link attachment. When the slider assembly reaches the forward most position on the track, the blocker doors are fully deployed, causing the fan gas to be directed from its normal rearward direction of flow to a forwardly direction through the opening 23 created between the cowl portions 26, 27 as a result of the rearward deployment of the translatable cowl portion. The blocker door deployment action is reversed when it is desirable to return the blocker doors to a normal flight stowed position, as shown in FIGS. 2 and 7.

It should be understood that the rearward translatable cowl portion may be deployed only partially rearward for example to its 27a or 27b intermediate positions for partial reversing action of the fan gases.

Some configurations, due to the reversing action desired, may include reversing cascades (not shown) installed within the opening betwen the cowl section and be either fixedly positioned or translatable with the translatable cowl portion to improve or change the degree of reversing of the fan gas.

It will thus be seen that the objects set forth above, among those made apparent from the preceding description, are efficiently attained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention, which as a matter of language, might be said to fall therebetween.

Now that the invention has been described, What is claimed is:

1. An improved deployment mechanism for blocker doors utilized for redirecting the normal rearward fan air path of a turbo fan aircraft engine, said engine being enclosed by a two-portion nacelle, a forward nacelle portion is fixedly secured to said engine and a rearward portion being translatable by conventional translating means; a peripheral opening is provided between said portions when said rearward portion is in a translated position, said translating means comprising:

at least a pair of said blocker doors being pivotally attached to said fixed section for rotational movement between a stowed position wherein the fan air in said fan air path is unaffected to a deployed position wherein said fan air path is directed through said peripheral opening;

a yoke assembly for each pair of said blocker doors, said yoke assembly is attached to and translatable with said rearward section, the outer opposite edges of said yoke having a track therealong;

a slide member slideably engaging each of said tracks;

a first drag link pivotally attached at one end to said forward nacelle portion and at its opposite end to one of said slide members; and a blocker door actuating link pivotally attached at one end to one of said blocker doors and at its opposite end to one of said slide members.

2. The invention as defined in claim 1, where the distance between said tracks and their associated blocker door sliders change therebetween as said rearward section is translated.

3. The invention as defined in claims 1 or 2, wherein said tracks are arcuate.

4. The invention as defined in claim 1, wherein said first drag link and blocker door actuating link members are connected to said slider, remote from said track.

5. The invention defined in claim 1, wherein said first drag link and blocker door actuating link members are connected to said slider along the center line of said track.

6. The invention as defined in claim 1, wherein a pair of said blocker door actuating link members are employed for operating a pair of said blocker doors are connected to a common slider.

* * * * *